United States Patent Office 3,397,242
Patented Aug. 13, 1968

3,397,242
SULFONE PRODUCTION
Harvey S. Klein, Berkeley, Calif., assignor to Shell
Oil Company, New York, N.Y., a corporation of
Delaware
No Drawing. Filed Oct. 15, 1965, Ser. No. 496,668
5 Claims. (Cl. 260—607)

ABSTRACT OF THE DISCLOSURE

Ethyl 2-butenyl sulfone is produced as the major product when ethylene is contacted with sulfur dioxide in the presence of palladium halide as catalyst in an organic reaction solvent.

This invention relates to an improved method for the production of ethyl 2-butenyl sulfone.

The reaction of sulfur dioxide with a 1,3-conjugated diene to produce an unsaturated sulfone product is well known in the art. For example, butadiene undergoes an uncatalyzed reaction with sulfur dioxide to produce 3-sulfolene. However, sulfur dioxide does not react with monoolefins in an analogous manner.

It is an object of the present invention to provide an improved method for the production of unsaturated sulfones. More particularly, it is an object to provide an improved method for the production of ethyl 2-butenyl sulfone from ethylene and sulfur dioxide.

It has now been found that these objects are accomplished by the process of contacting ethylene and sulfur dioxide in the presence of a palladium halide catalyst. Although the mechanism of the process is not known with certainty, it is considered likely that the initial reaction results in the formation of ethyl vinyl sulfone, an observed by-product, with subsequent reaction resulting in the observed formation of ethyl 2-butenyl sulfone.

The catalyst employed in the process of the invention is a palladium halide, that is, a compound of the formula $PdX_2$ wherein X is halogen. Although palladium halides wherein the halogen is fluorine or iodine are in part operable, better results are obtained when the catalyst is a palladium halide of halogen of atomic number from 17 to 35, that is, the middle halogens chlorine and bromine. Particularly preferred as catalyst is palladium chloride, $PdCl_2$.

The palladium halide is employed in catalytic quantities. Molar ratios of palladium halide to the limiting reactant, i.e., whichever of the sulfur dioxide or ethylene reactants is present in the lesser number of equivalents, of from about 1:5 to about 1:50 are satisfactory, with molar ratios of from about 1:7 to about 1:20 being preferred.

No special precautions are required with regard to the ethylene and sulfur dioxide reactants, and commercially available grades of these materials are suitably employed. The ratio of sulfur dioxide to ethylene is not critical, although it is generally desirable to employ a molar amount of ethylene that is at least stoichiometric, i.e., at least 3 moles of ethylene per mole of sulfur dioxide. Molar ratios of ethylene to sulfur dioxide of from about 3:1 to about 12:1 are satisfactory with ratios of from about 4:1 to about 8:1 being preferred.

The process of the invention is conducted in the liquid phase in solution in an inert reaction solvent. Solvents that are suitably employed are those organic solvents which are liquid at reaction temperature and pressure and are inert to the reactants as well as the products thereof. Illustrative solvents include hydrocarbons such as benzene, toluene, heptane, isooctane, cyclohexane and methylcyclopentane; halogenated hydrocarbons such as chloroform, carbon tetrachloride and methylene bromide; nitriles such as propionitrile, acetonitrile and benzonitrile; sulfones such as methyl butyl sulfone, diethyl sulfone and sulfolane; and ethers including dialkyl ethers such as dipropyl ether, dibutyl ether and propyl hexyl ether, lower alkyl ethers (full) of polyhydric alcohols and poly(oxyalkylene)glycols such as dimethoxyethane, glycerol triethyl ether and diethylene glycol dimethyl ether, and cyclic ethers such as dioxane and tetrahydrofuran. In general, the preferred solvents comprise the hydrocarbons, particularly aromatic hydrocarbons.

The amount of solvent to be employed is not critical and molar ratios of reaction solvent to total reactants of from about 1:2 to about 20:1 are satisfactory.

The method of reactant contacting may be varied. In one modification of the process of the invention, the entire amounts of reactants, catalyst and solvent are charged to an autoclave or similar reactor wherein the mixture is maintained at reaction conditions until reaction is complete. In an alternate modification one reactant is added to the remaining reaction mixture components in increments, preferably as by adding ethylene to the other reaction mixture components. In yet another modification, reaction is effected in a continuous operation as by contacting the reactants and catalyst during passage through a tubular reactor. In any modification, the reaction is conducted at elevated temperature and pressure. Suitable reaction temperatures vary from about 40° C. to about 120° C. with the temperature range from about 50° C. to about 100° C. being preferred. The optimum reaction pressure will be somewhat dependent upon the particular reaction temperature employed, as the reactants are normally gaseous at reaction temperature. Typical reaction pressures vary from about 100 p.s.i. to about 1000 p.s.i. although reaction pressures from about 300 p.s.i. to about 800 p.s.i. are preferred. Subsequent to reaction, the reaction mixture is separated and the desired sulfone product is recovered by conventional methods, e.g., fractional distillation, selective extraction, fractional crystallization or the like.

The major reaction product comprises ethyl 2-butenyl sulfone, predominately ethyl trans-2-butenyl sulfone, with a lesser proportion of ethyl vinyl sulfone frequently being observed. The formation of the ethyl vinyl sulfone does not serve as any great detriment, however, for as previously stated it is considered that the vinyl sulfone is an intermediate in the production of the 2-butenyl sulfone product. Thus, any ethyl vinyl sulfone product is suitably reacted with additional ethylene to produce ethyl 2-butenyl sulfone, either by a subsequent separate reaction or by separation and recycle of the ethyl vinyl sulfone to the initial reaction zone wherein it is contacted with additional ethylene and sulfur dioxide. In the modification where ethyl vinyl sulfone and ethylene are reacted as a separate process, the ethyl vinyl sulfone is contacted with from about 1 mole to about 4 moles of ethylene per mole of the sulfone, under the conditions as described above for the initial ethylene-sulfur dioxide reaction.

The unsaturated sulfone products find utility in a variety of applications, particularly as chemical intermediates. The sulfones are hydrogenated to the corresponding saturated sulfones, e.g., ethyl butyl sulfone, or are hydrated or hydroxylated to produce hydroxylic materials useful in the production of ethers or esters. Halogen is added to the unsaturated linkage to produce the corresponding dihalo derivatives and the unsaturated linkage additionally serves as a reactive site in processes of polymerization or copolymerization.

To further illustrate the improved process of the invention, the following examples are provided. It should be understood that the details thereof are not to be regarded as limitations, as they may be varied as will be understood by one skilled in this art.

Example I

To an autoclave was charged 15 g. of ethylene, 6 g. of sulfur dioxide, 2 g. of palladium chloride and 20 ml. of benzene, and the mixture was maintained for 24 hours at a temperature of 75° C. and a maximum pressure of 700 p.s.i. The product, 4.5 g., consisted of approximately 15% by weight of ethyl vinyl sulfone and approximately 80% by weight of ethyl trans-2-butenyl sulfone, B.P. 265° C., $n_D^{25}$ 1.4750, for which the following elemental analysis was obtained.

Calc. for $C_6H_{12}SO_2$: C, percent wt. 48.6; H, percent wt. 8.1; S, percent wt. 21.6. Found: C, percent wt. 48.3; H, percent wt. 8.3; S, percent wt. 21.4.

The nuclear magnetic resonance spectrum of the product was consistent with the above structure.

Example II

By a procedure similar to that of Example I, a mixture of 1.0 g. of ethyl vinyl sulfone, 17.0 g. of ethylene, 0.5 g. of palladium chloride and 20 ml. of benzene was maintained at a temperature of 75° C. and a maximum pressure of 750 p.s.i. for 17 hours. The product mixture was separated and analyzed by gas-liquid chromatographic techniques. The conversion of ethyl vinyl sulfone was 92%, and based on the ethyl vinyl sulfone converted a quantitative yield of ethyl 2-butenyl sulfone, B.P. 265° C., $n_D^{25}$ 1.4750, was obtained.

I claim as my invention:

1. The process for the production of ethyl 2-butenyl sulfone which comprises contacting sulfur dioxide with from about 3 moles to about 12 moles of ethylene per mole of sulfur dioxide, in liquid-phase solution in inert reaction solvent, in the presence of a catalytic amount of palladium halide catalyst, at a temperature of from about 40° C. to about 120° C. and a pressure of from about 100 p.s.i. to about 1000 p.s.i.

2. The process of claim 1 where the catalyst is palladium halide wherein the halogen is halogen of atomic number from 17 to 35.

3. The process of claim 2 wherein the catalyst is palladium chloride present in an amount from about 0.02 mole to about 0.2 mole of sulfur dioxide.

4. The process for the production of ethyl 2-butenyl sulfone which comprises contacting ethyl vinyl sulfone with from about 1 mole to about 4 moles of ethylene per mole of ethyl vinyl sulfone in liquid-phase solution in inert organic reaction diluent, in the presence of from about 0.02 mole to about 0.2 mole per mole of ethyl vinyl sulfone of palladium halide catalyst wherein the halogen is halogen of atomic number from 17 to 35, at a temperature of from about 40° C. to about 120° C. and a pressure of from about 100 p.s.i. to about 1000 p.s.i.

5. The process for the production of ethyl 2-butenyl sulfone which comprises contacting ethyl vinyl sulfone with from 1 mole to about 4 moles of ethylene per mole of ethyl vinyl sulfone, in liquid-phase solution in inert organic reaction diluent, in the presence of from about 0.02 mole to about 0.2 mole of palladium chloride per mole of ethyl vinyl sulfone, at a temperature of from about 40° C. to about 120° C. and a pressure of from about 100 p.s.i. to about 1000 p.s.i.

References Cited

UNITED STATES PATENTS 2,557,666    6/1951    Kreuz _____ 260—332.8

CHARLES B. PARKER, *Primary Examiner.*

D. R. PHILLIPS, *Assistant Examiner.*